(12) United States Patent
Pianciola et al.

(10) Patent No.: US 6,264,372 B1
(45) Date of Patent: Jul. 24, 2001

(54) POLARIZATION-MAINTAINING CONNECTOR

(75) Inventors: Aurelio Pianciola, Casteggio-Pavia; Simona Scotti, Voghera-Pavia, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/612,596

(22) Filed: Jul. 7, 2000

Related U.S. Application Data

(63) Continuation of application No. PCT/EP98/08084, filed on Dec. 14, 1998.
(60) Provisional application No. 60/071,724, filed on Jan. 16, 1998.

(30) Foreign Application Priority Data

Jan. 8, 1998 (EP) .................................................. 98100185

(51) Int. Cl.$^7$ ...................................................... G02B 6/38
(52) U.S. Cl. .............................. 385/60; 385/147; 385/31; 385/25
(58) Field of Search ........................... 356/73.1; 385/147, 385/31, 60, 25

(56) References Cited

U.S. PATENT DOCUMENTS

| 4,792,205 | 12/1988 | Yin et al. . |
| 4,919,509 | 4/1990 | Miller et al. . |
| 5,216,733 | 6/1993 | Nagase et al. . |
| 5,245,400 | * 9/1993 | Anjan et al. . |
| 5,417,733 | * 5/1995 | Wesson . |
| 5,666,449 | 9/1997 | Sawae et al. . |
| 5,682,451 | * 10/1997 | Lee et al. . |

FOREIGN PATENT DOCUMENTS

| 0 246 165 | 11/1987 | (EP) . |
| WO 96/37792 | 11/1996 | (WO) . |

* cited by examiner

Primary Examiner—Hung N. Ngo
(74) Attorney, Agent, or Firm—Finnegan, Henderson, Farabow, Garrett & Dunner, L.L.P.

(57) ABSTRACT

Method of determining the axis of polarization of polarization-maintaining fibers, comprising: a) sending a polarized optical signal along a polarization fiber; b) emitting the polarized optical signal from one end of the fiber; c) inserting a polarizer between the fiber and an optical power; d) rotating the polarizer, and e) rotating the optical fiber.

5 Claims, 7 Drawing Sheets

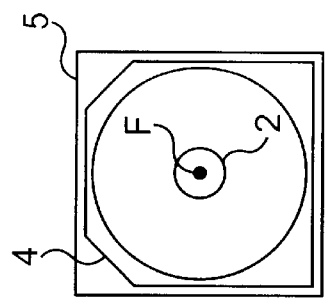
FIG. 6b
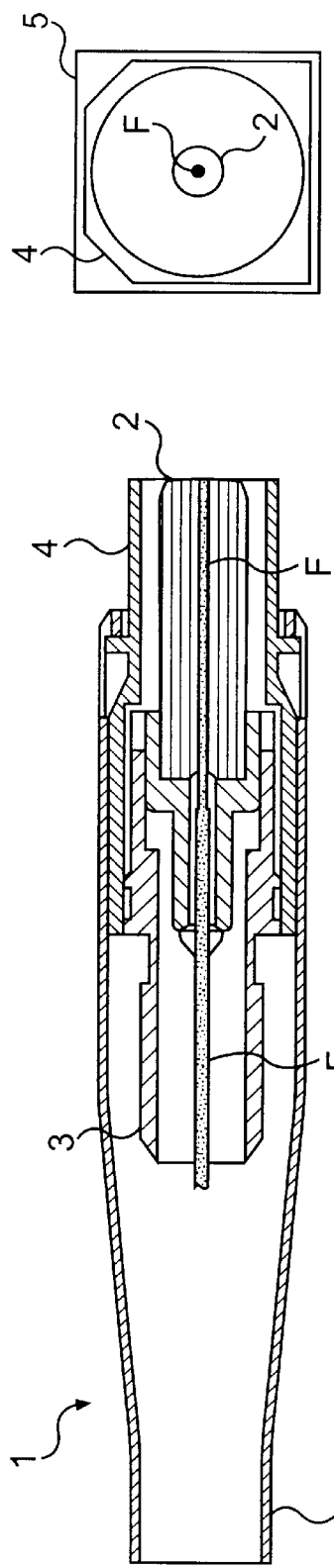
FIG. 6a
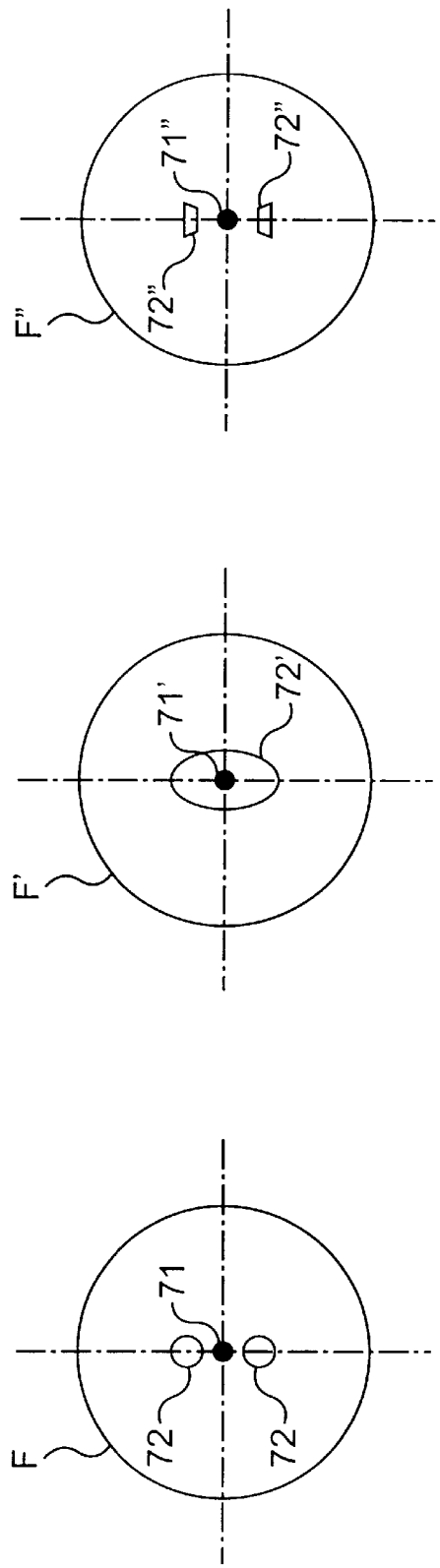
FIG. 7a
FIG. 7b
FIG. 7c

POLARIZATION-MAINTAINING CONNECTOR

This application is a continuation of International Application No. PCT/EP98/08084, filed Dec. 14, 1998 and claims the benefit of provisional application No. 60/071,724, filed Jan. 16, 1998, the content of both of which is incorporated herein by reference.

The present invention relates to the field of connectors for polarization-maintaining fibres. In particular, the present invention relates to optical fibres within which light beams polarized in predetermined directions travel, and which are connected to optical devices by means of the said connectors.

Polarization-maintaining fibres (PMF) are characterized in that they maintain the polarization of the input signal throughout their length, if this polarization is orientated in one of the two directions of polarization of the fibre.

In particular, these fibres have two principal axes of propagation of the optical signal within them, called the "slow" axis and the "fast" axis. The said axes are substantially perpendicular to each other and have different characteristics. The fast axis has a refractive index which is substantially lower than that of the slow axis, and therefore enables the light beam polarized in the same direction to travel along the fibre at a higher phase velocity than that of the light beam polarized in the direction of the slow axis. In both directions, however, the signal is kept substantially unaltered at the output of the fibre.

The connectors for this type of fibre generally have a distinctive sign which identifies an axis with which the axis of polarization of the fibre has to be aligned. In this way, after the final assembly of the connector and fibre, the axis of polarization of the fibre can be recognized from the outside; consequently, if the signal sent along the fibre is polarized consistently with the said axis of the fibre, the polarization of the signal can be recognized by identifying this distinctive sign on the body of the connector. The said distinctive sign is also called the connector key.

Additionally, the connector key is generally associated with means for coupling the connector to an optical unit or to a bush which permits joining to another section of polarization-maintaining fibre. These means associated with the connector key provide a unique axial position of coupling to the exterior in such a way that the polarization of the signal is maintained beyond the connector.

A parameter which can be used to evaluate the efficiency of a polarization-maintaining fibre and the efficiency of the joint between the fibre and a connector is the extinction ratio (ER), defined as the logarithm of the ratio between the power connected to one of the two principal axes of the maintaining fibre and that connected to the other perpendicular axis along which power is not to be sent; (another conventionally used definition is the logarithm of the ratio between the power connected to the non-excited axis and the total power).

In particular, this parameter is of fundamental importance in the evaluation of the efficiency of a method for coupling these polarization-maintaining fibres to a connector. The connection provides for the alignment between one of the axes, slow or fast, of polarization of the fibre and that of the connector, defined by the position of the key. If this alignment is imperfect when the fibre has been connected to another fibre or to an optical unit, the extinction ratio decreases significantly and consequently the connection causes a degradation of the transmitted signal.

To obtain the best extinction ratio characteristics in terms of repeatability, it is known that, with polarization-maintaining fibres, it is preferable to use connectors called the SC type rather than connectors called the FC type. An SC type connector provides engagement by insertion, in a bush for example, while an FC type connector provides engagement by screwing the connector on to the bush, thereby carrying out a rotation which may generate residual torsions, resulting in a low repeatability of the connection operation.

In U.S. Pat. No. 4,792,205, the optical axes of the PMF are aligned by using a method of visual alignment of the geometrical axes of the fibre disposed inside the ferrule capable of rotating with the fibre inside it, by means of observation through a microscope and a fixed reference grid. Once the optimal visual alignment has been determined, the ferrule is finally locked inside the connector.

To obtain a greater precision of alignment, active alignment is used; this consists in sending a polarized light beam along the fibre and, by means of optical power meters, measuring at the output the power sent along the fibre emerging from the connector. This method requires a system comprising polarizers aligned with geometrical references with respect to which the axes of birefringence of the fibre are positioned.

U.S. Pat. No. 4,919,509 describes a connection between polarization-maintaining fibres comprising a first and a second ferrule, each of which has a longitudinal through hole which terminates in a vertical wall at one end of the ferrule; two polarization-maintaining fibres which are inserted into the ferrules, without their external protective covering and having the same cross section as the through holes in the ferrules, which terminate at the said vertical walls; means of position recognition associated with each ferrule, which enable the ferrules to be disposed in the preferred position for a polarization-maintaining connection; and means which enable the said first and second ferrule to be connected together longitudinally in the said preferred position in such a way that the axis of polarization of the first fibre is aligned with the axis of polarization of the second fibre.

U.S. Pat. No. 5,216,733 describes a polarization-maintaining connector which is capable of connecting two polarization-maintaining fibres or connecting one fibre of this type to an optical unit, and which comprises a ferrule having a through hole into which the fibre can be inserted, a flange having a key for fitting the said ferrule on to it, and means for engaging the said flange with the external circumference of the ferrule.

This patent also describes a method of assembling a connector to produce a connection between two polarization-maintaining optical fibres or between one fibre of this type and an optical unit, comprising the stages of:

fixing the end of a polarization-maintaining optical fibre to the end of the body of a ferrule by means of an adhesive;

grinding the said end of the ferrule and simultaneously the end of the fibre;

visually aligning a flange, by means of a key present on it, with the axis of polarization of the fibre;

fitting the said flange on to the body of the ferrule;

rotating the body of the ferrule in such a way as to align the key of the flange with the axis of polarization of the fibre in the ferrule, while observing the ground terminal part of the said fibre;

securing the flange in the body of the ferrule.

The patent application WO9637792 describes a connector subassembly for non-cylindrically symmetrical optical elements comprising a holding member for an optical element, wherein said holding member comprises at least an alignment feature, an inner sleeve member comprising at least one co-operative alignment feature adapted to engage the alignment feature on said holding member and a housing with an interior surface adapted to receive said holding member and said inner sleeve member, and an external surface comprising a rotational alignment reference. Said holding member is freely rotatable with respect to said housing to rotationally align said optical element at an optimal angle with respect to said reference on the housing.

According to the present invention, an alignment procedure has been discovered which enables a high-precision geometrical reference to be formed on a flat work surface by means of a polarized light beam sent along the fibre. The alignment process is based on the fact that the said geometrical reference, actively determined and coinciding with the axis of the connector key, is used to align the fibre with it.

It has also been discovered, in particular, that if the alignment of the connector with the axis of polarization of the fibre is carried out after the process of assembling the said connector, errors and imperfections due to the mechanical tolerances of the various parts of which the connector consists are avoided. Consequently the connector made according to the present invention has characteristics which enable the axis of polarization of the fibre to be aligned with the key of the connector and with a reference plane after the stage of assembly of the said connector.

In a first aspect, the present invention relates to a polarization-maintaining connector comprising a supporting element in which a polarization-maintaining fibre is fixed, a first inner casing in which the said supporting element is inserted, and an outer containing body on which there is a key and which contains the inner casing, characterized in that the said supporting element has external circular symmetry and is free to rotate about its longitudinal axis inside the said inner casing.

Preferably, the said supporting element comprises a ferrule, inside which the polarization-maintaining fibre is fixed, and a lock ring which is fitted over the said ferrule.

In particular, the said inner casing comprises a front portion having a first internal radius, in which the lock ring is inserted, terminating at a shoulder, and a rear portion having a second internal radius, smaller than the first, on which two opposing transverse stop shoulders are disposed.

In particular, the ferrule comprises a cylindrical body made from ceramic material with a through hole, within which the fibre is disposed after the corresponding protective covering has been removed from at least the portion inserted in the said body, at least one of the two ends of the said cylindrical body being engaged in a flange provided, in the area of engagement with the cylindrical body, with at least one notch.

In particular, the said lock ring comprises a cylindrical front portion which has, on the free terminal edge, at least one projection which is inserted into the at least one notch of the flange, a central portion comprising two annular sectors and a cylindrical rear portion on whose lateral surface two opposing cavities are formed.

In particular, in the said portion a longitudinal slot extending over part of the length of the said portion is present on at least one of the lateral surfaces, for the subsequent securing of the lock ring in the inner casing.

In a second aspect, the present invention relates to a mechanical connection between polarization-maintaining optical fibres, comprising two connectors of the aforesaid type and a bush having two opposing sockets for the insertion of these connectors, provided with opposing alignment keys in line with the corresponding keys of the connectors.

In a further aspect, the present invention relates to a method of connecting a polarization-maintaining fibre to an orientated connector, characterized in that it comprises the stages of:

fixing a polarization-maintaining fibre in a supporting element with external circular symmetry;

inserting the said supporting element in an inner casing having circular symmetry internally;

rotating the said supporting element inside the inner casing in such a way as to align one of the two axes of polarization of the fibre with a reference which is present on the said inner casing and which can be directly related to the containing body of the connector;

fixing the supporting element rotationally in the inner casing in the position found in the preceding step;

engaging the inner casing in the containing body of the connector.

Preferably, the said stage of fixing a polarization-maintaining fibre in a supporting element comprises the following stages:

inserting a polarization-maintaining fibre into a ferrule;

securing this fibre inside the ferrule;

inserting the said ferrule into a lock ring.

In a further aspect, the present invention relates to an apparatus for determining the axis of polarization of optical fibres with respect to a fixed reference comprising a reference plane on which are disposed, along a horizontal axis parallel to the said plane, a support for fixing the said fibre, a lens for collimating the polarized beam, a polarizer mounted on a precision rotator with a base which slides along a precision guide, an optical head connected to an optical power meter, and a light source and a polarizer both connected to the fibre.

In a further aspect, the present invention relates to a method of determining the axis of polarization of polarization-maintaining fibres, comprising the stages of:

a) sending a polarized optical signal along a polarization-maintaining fibre;

b) emitting said polarized optical signal from one end of the said fibre in the form of a light beam directed along an optical axis and orientated along one of the two axes of polarization of the said fibre;

c) measuring and recording the optical power of the beam emerging from the fibre, by means of an optical power meter;

d) inserting a polarizer having at least one axis of maximum or minimum transmissivity between the fibre and the said optical power meter, in such a way that the optical axis of propagation of the beam passes through the polarizer, and with one of the said axes orientated in a predetermined position with respect to a reference plane;

e) rotating the optical fibre about the optical axis until the meter shows the value recorded in stage c), less a predetermined quantity;

f) identifying the axis of polarization of the fibre with the orientated axis of the polarizer.

Preferably, the said stages of orientating the polarizer and rotating the optical fibre comprise the further stages of:

a) visually pre-orientating one of the two axes of polarization of the fibre at a predetermined angle with respect to a reference plane;

b) rotating the said polarizer about an axis parallel to the said optical axis until a minimum output power is measured;

c) recording this angular position reached by the polarizer in the preceding step;

d) rotating the polarizer about its vertical axis, bringing its rear face in front of the fibre;

e) rotating the polarizer again about an axis parallel to the said optical axis until the said minimum output power is measured;

f) recording this angular position reached by the polarizer in the preceding step;

g) rotating the polarizer about an axis parallel to the said optical axis through an angle corresponding to half the difference between the two angles measured in the two preceding rotations;

h) rotating the optical fibre about the optical axis in such a way as to orientate one of its axes of polarization until the said minimum output power is substantially measured on the meter;

i) repeating stages b) to h) until the angle of the rotation carried out in stage g) becomes substantially constant.

Alternatively, the said stages of orientating the polarizer and rotating the optical fibre comprise the further stages of:

a) visually pre-orientating one of the two axes of polarization of the fibre at a predetermined angle with respect to the reference plane;

b) rotating the said polarizer about an axis parallel to the said optical axis until a maximum output power is measured;

c) recording this angular position reached by the polarizer in the preceding step;

d) rotating the polarizer about its vertical axis, bringing its rear face in front of the fibre;

e) rotating the polarizer again about an axis parallel to the said optical axis until the said maximum output power is measured;

f) recording this angular position reached by the polarizer in the preceding step;

g) rotating the polarizer about an axis parallel to the said optical axis through an angle corresponding to half the difference between the two angles measured in the two preceding rotations;

h) rotating the optical fibre about the optical axis in such a way as to orientate one of its axes of polarization until the said maximum output power is substantially measured on the meter;

i) repeating stages b) to h) until the angle of the rotation carried out in stage g) becomes substantially constant.

In particular, the said stage of visually pre-orientating the axis of polarization of the fibre with respect to the reference plane comprises the stages of:

observing the end of the polarization-maintaining fibre under a microscope;

rotating the fibre about the optical axis into a position with one of the two axes of polarization substantially orthogonal to the reference plane.

Preferably, the said predetermined quantity is lower than 0.2 dB.

Preferably, the said polarized optical signal is orientated along the slow axis of polarization of the fibre.

Preferably, the axis of polarization of the fibre is orientated orthogonally to the reference plane and the axis of maximum transmissivity of the polarizer is aligned parallel to the reference plane.

In particular, the said stage of sending a polarized optical beam along a polarization-maintaining fibre comprises the connection of a light source and a polarizer to the said fibre.

The present invention will subsequently be described, by way of example, with reference to the attached figures, in which:

FIG. 2b shows, in a frontal view, the ferrule shown in FIG. 2a.

FIG. 3b shows, in a frontal view, the lock ring shown in FIG. 3a.

FIG. 5b shows in a frontal view the casing shown in FIG. 5a.

FIG. 6a shows a longitudinal section of the assembled connector with the optical fibre inside it.

FIG. 6b shows a frontal view of the assembled connector with the optical fibre inside it.

FIG. 7a shows a transverse section of an example of a polarization-maintaining fibre with the geometrical axis of polarization emphasized.

FIG. 7b shows a transverse section of a further example of a polarization-maintaining fibre.

FIG. 7c shows a transverse section of a further example of a polarization-maintaining fibre.

The attached figures show an embodiment of the connector according to the present invention; this embodiment provides an example but is not restrictive, since the method is equally applicable to other types and shapes of connectors.

Figure 1:
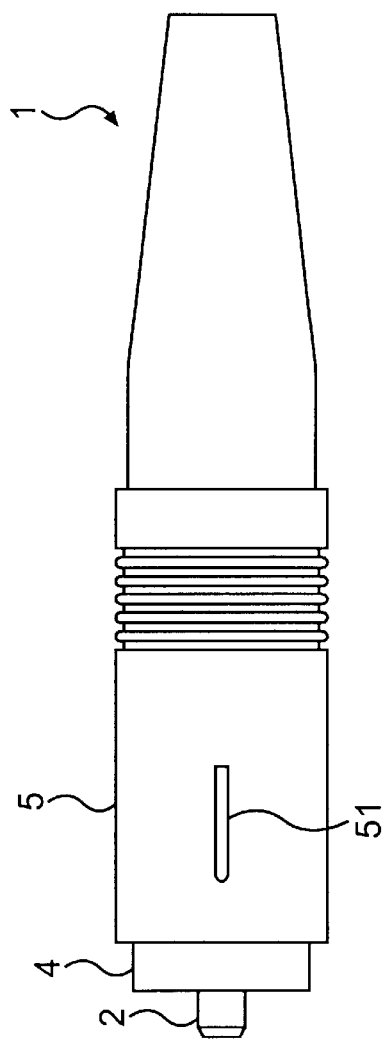
FIG. 1 shows a frontal view from above of the polarization-maintaining connector, according to one embodiment of the present invention.

FIG. 1 shows the polarization-maintaining connector as a whole, and FIGS. 2 to 5 show the corresponding component parts. In particular, the connector comprises a ferrule 2, inside which are fixed a polarization-maintaining fibre F, a lock, or securing, ring 3 for the ferrule 2, a first inner casing 4 for the assembly formed by the securing ring 3 and the ferrule 2, and an outer containing body 5, also called the outer casing. On the last of these, a connector key 51 is emphasized; this enables the direction of the axis of polarization of the fibre to be recognized.

Figure 2B:
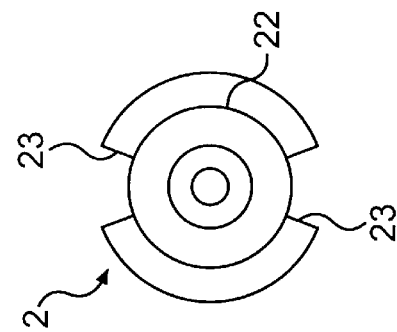
Figure 2A:
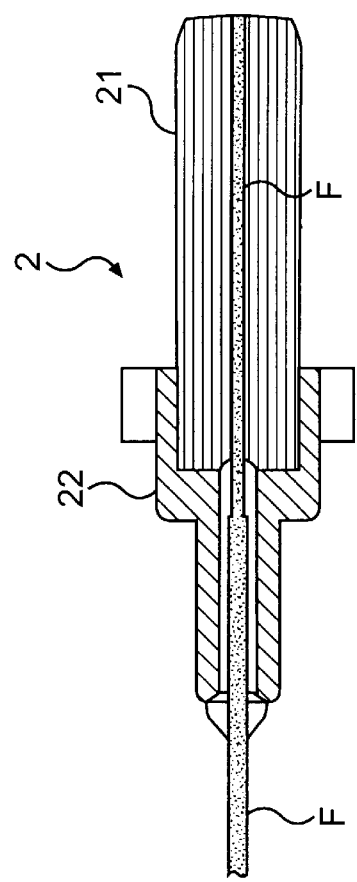
FIG. 2a shows, in a longitudinal section, the ferrule with the polarization-maintaining fibre inserted into it, according to the present invention.

FIGS. 2a and 2b show the ferrule 2, comprising a cylindrical body 21 made from ceramic material, with a through hole, within which is disposed the fibre F from which the corresponding protective covering (called the "coating") has been removed over at least the portion inserted into the body 21. One of the two ends of the said cylindrical body 21 is engaged in a flange 22, preferably made from metal, through which the fibre passes. The flange 22 is provided, in the area of engagement with the cylindrical body 21, with at least one notch 23 and preferably with a pair of opposing notches.

Figure 3B:
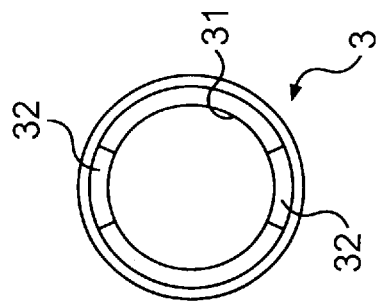
Figure 3A:
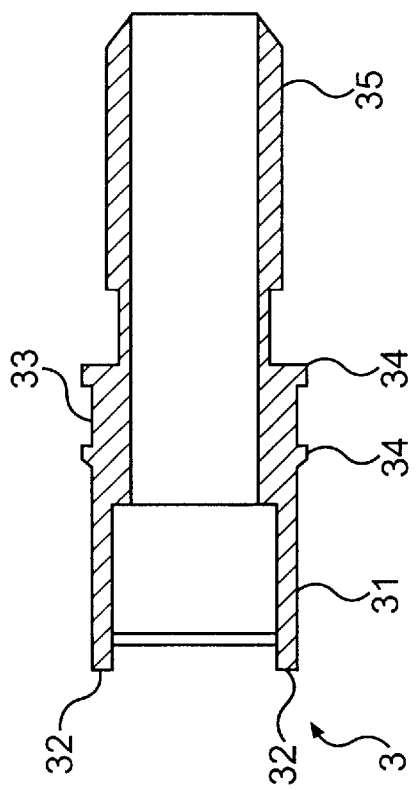
FIG. 3a shows, in a longitudinal section, the lock ring in which the ferrule is inserted according to the present invention.
Figure 4:
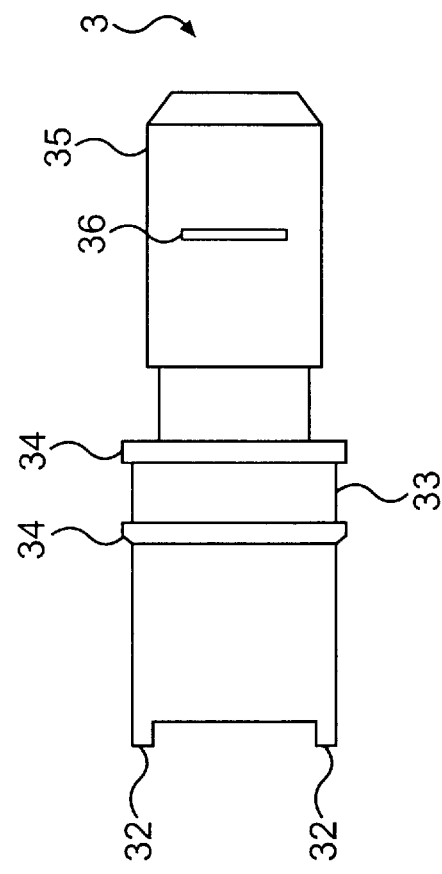
FIG. 4 shows, in a lateral view, the lock ring shown in FIGS. 3a and 3b.

FIGS. 3a, 3b and 4 show the lock ring 3, comprising a cylindrical front portion 31 which has, on its free end, two opposing projections 32 which are inserted into the notches 23 of the flange 22 of the ferrule 2; a central portion 33 comprising two annular sectors 34 and a cylindrical rear portion 35 on whose lateral surface two opposing cavities 36 are formed.

Figure 5B:
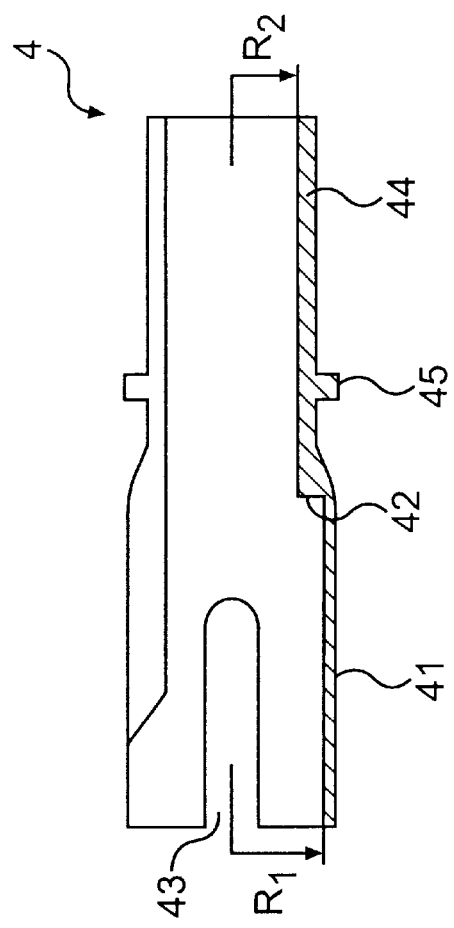
Figure 5A:
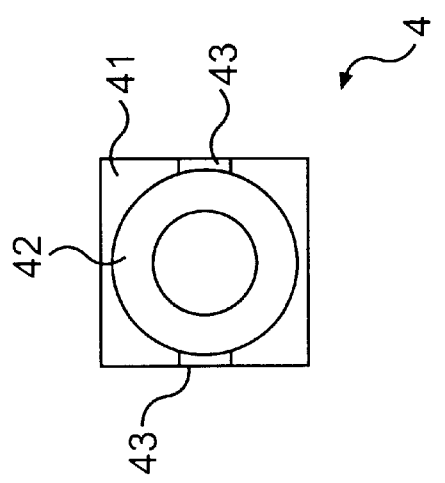
FIG. 5a shows, in a lateral view and in partial section, the plastic casing of the connector according to the present invention.

FIGS. 5a and 5b show the inner casing 4, which in this embodiment is made from plastic, having a tubular configuration, with a substantially prismatic outer surface, comprising a front portion 41 having a first internal radius R1 terminating at a shoulder 42 and followed by a rear portion 44 having a second internal radius R2 which is smaller than R1. On at least one of the lateral surfaces of the said portion 41 there is a longitudinal slot 43 extending over part of the length of the said portion and suitable for subsequently securing the ring 3 in the casing. Two transverse opposing stop shoulders 45 are disposed on the rear portion 44 of the casing 4.

The whole structure of the lock ring 3 has a circular symmetry such that it can be rotated inside the inner casing 4.

The connector is illustrated in detail in fully assembled form in FIG. 6a.

In a first stage, the fibre, with the outer covering removed from it over a predetermined portion, is inserted into the ferrule 2; conveniently, to minimize the degradation of the ER in the assembly, the hole in the element 21 holds the fibre with a small amount of play.

For example, this may be done by choosing the ferrules in such a way that they have a diameter such that the fibre is subject to a limited amount of friction when inserted in the ferrule: this means that the ferrules which are used have a hole diameter slightly greater than the external diameter of the fibre which is used.

This play is chosen in such a way that the adhesive used to secure the fibre inside the ferrule forms the most uniform possible layer around the fibre and minimizes the residual stresses.

This choice provides the best compromise between performance in terms of ER and insertion losses (IL), since there are no errors of concentricity such that these losses are degraded.

The system for positioning the fibre inside the ferrule must be such that it prevents the bending of the fibre in the engagement area, or any stresses, which might cause a degradation of the ER of the polarized light beam propagated along the fibre. For this purpose, it is convenient, after contact has been made between the covering of the fibre and the inner walls of the ferrule, to withdraw the fibre by approximately 1 mm.

When assembled, the ferrule 2 is inserted into the lock ring 3 and kept in this position by the projections 32 of the ring which are inserted into the corresponding cavities 23 of the flange 22 of the ferrule 2.

The assembly consisting of the ferrule 2 and lock ring 3 is inserted, with the end having the projections 32 foremost, into the plastic casing 4, into the cavity whose depth is delimited by the shoulder 42 on which the flange 22 of the ferrule 2, which projects slightly from the rear part of the lock ring 3, comes to bear. In this position, the lock ring and the ferrule are free to rotate about their longitudinal axis, owing to the external circular symmetry of the lock ring 3 and the internal circular symmetry of the casing 4.

In this condition, one of the two axes of polarization of the fibre F is aligned with a reference plane, for example a horizontal plane, using the method described in detail below. This plane can be directly related to the key 51 disposed on the back of the connector 1 when the assembly of the connector is complete.

Then, when this axis of polarization has been identified, the lock ring is finally secured in the casing by inserting an adhesive, of the epoxy type for example, into the longitudinal slot 43 to fix the two parts together. Lastly, the connector is finally closed by inserting the inner casing 4 into the outer casing 5; the substantially prismatic shape of the inner casing 4 enables it to be inserted into the outer casing 5 in a single position which maintains the alignment with the key of the connector.

Figure 8:
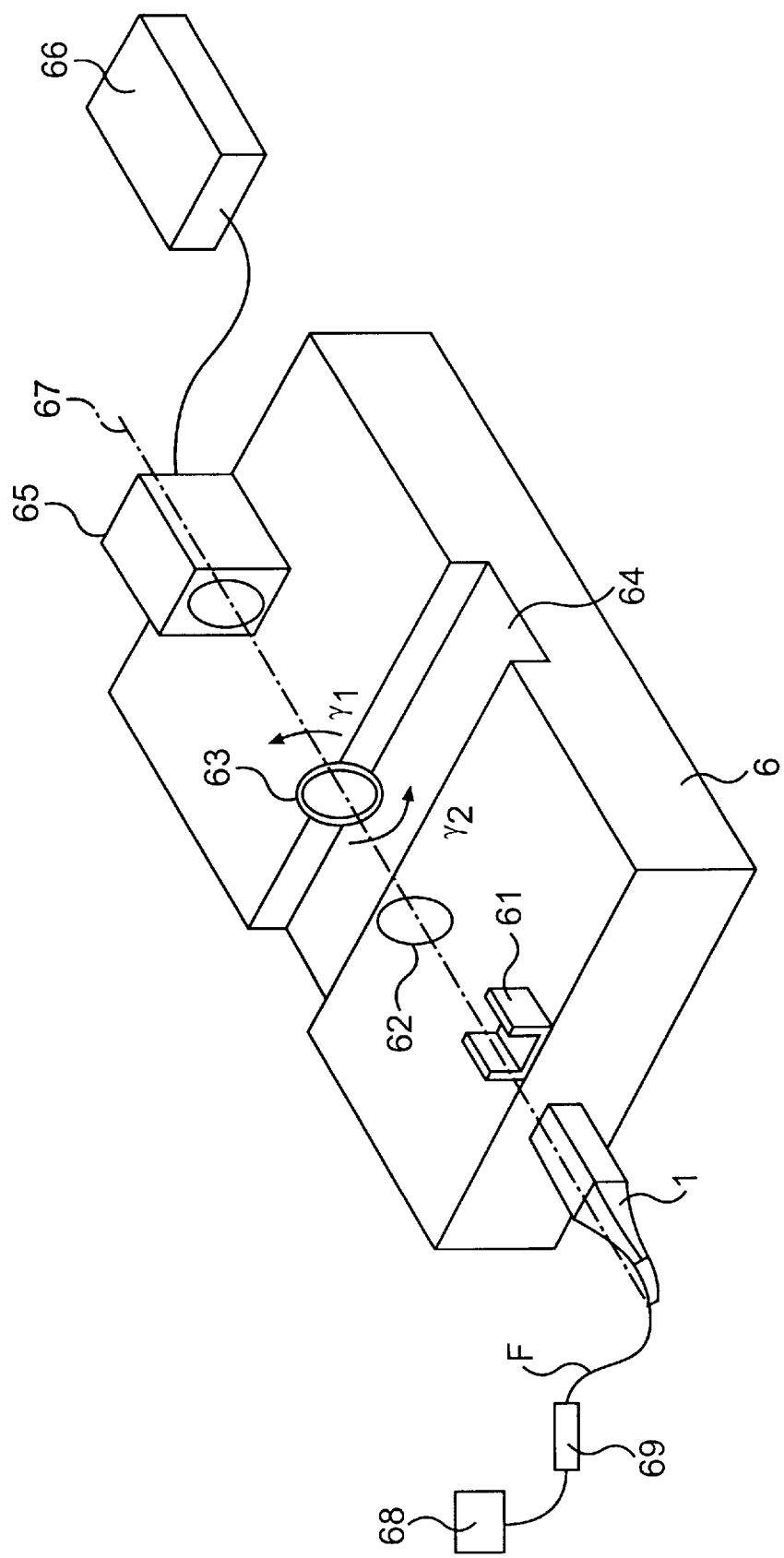
FIG. 8 shows the set of components used to implement the method for alignment with connectors of polarization-maintaining fibres disposed on the reference plane.

FIG. 8 shows the set of components which are used to carry out the alignment of polarization between the fibre F and the connector 1, comprising a flat work surface 6 on which the connector 1 is positioned and with respect to which one of the two axes of polarization of the fibre is aligned. In particular, a support 61 for fixing the connector 1 on the said plane, a lens 62 for collimating the polarized beam, and a polarizer 63 mounted on a precision rotator which permits rotation both about the optical axis 67 and about an axis orthogonal to it, as schematically shown in FIG. 8 by the arrows γ1 and γ2, are disposed on the plane along a horizontal axis which is parallel to the plane, is indicated by the reference number 67 in FIG. 6 and is called the optical axis, an optical head 65 connected to an optical power meter 66. The said polarizer has a base which slides along a guide 64, of the high-precision dovetail type for example. The indicated components are of a known type and are not described further.

Figure 9A:
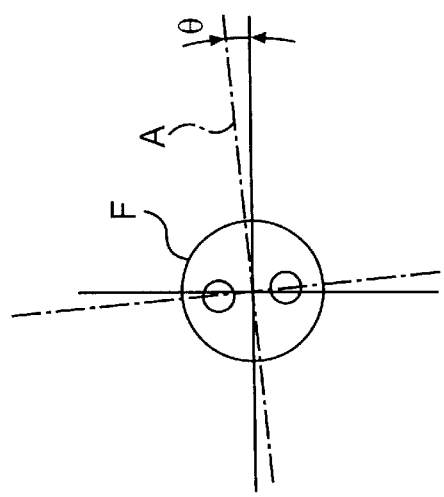
FIGS. 9a to 9c show schematically the successive stages of the method for the alignment of the polarization, in a polarization-maintaining fibre of the type shown by way of example in the preceding figures.
Figure 9C:
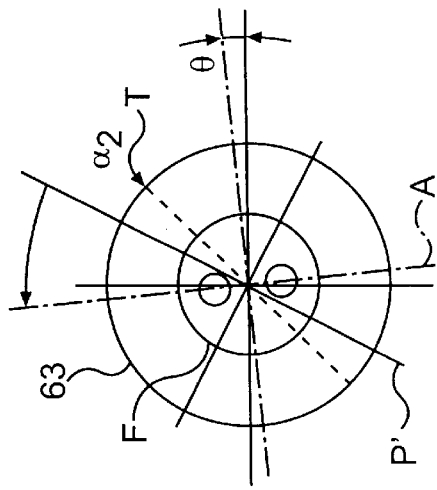
Figure 9:
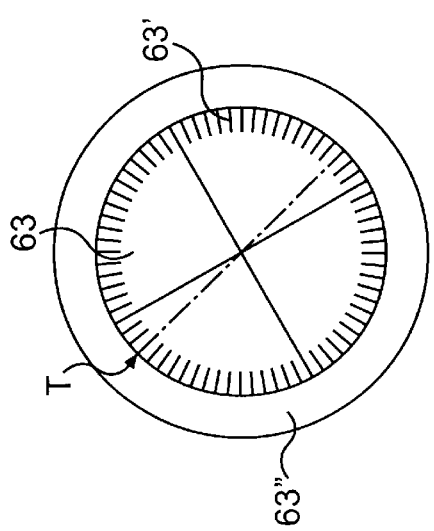
FIG. 9 shows in particular a polarizer of the type used to carry out the alignment.

This polarizer 63 is illustrated schematically in FIG. 9 and has a single axis, orientated along one of its diameters, through which the light can be propagated. When this axis is orthogonal to the polarization of the light, no light passes through the polarizer. When this axis is parallel to the polarization of the light, this light passes completely through the polarizer without loss of optical power. These axes are called the axes of maximum and minimum transmissivity. The polarizer also has a graduated scale 63' along its circumference; additionally, the rotator 63" is provided with at least one reference mark T.

The method for aligning the polarization of the fibre with the connector is based on the measurement made by the power meter 66 and on the possibility of sending along the fibre, by means of a light source 68 and a polarizer 69, a polarized optical signal which has a high extinction ratio (ER) and is orientated along one of the two axes of polarization of the said fibre.

As a function of the said signal, a light beam which is polarized, for example along the slow axis of polarization of the fibre, is emitted from the end of the fibre and consequently from the output of the connector, is directed along the optical axis 67 and is received by the power meter 66. Essentially, the method provides two separate stages which are repeated iteratively until a stage is reached at which the results do not improve further. This procedure is based on the limit set by the sensitivity of the measuring instruments, such as the rotating polarizer, which has for example a sensitivity down to 1/50 of a degree, and of the optical power meter. The method is then repeated iteratively until the optical power measuring instrument detects no more power variations at its input.

In the first stage the axis of the polarizer 63 is aligned, for example, with respect to the axis orthogonal to the flat work surface 6, and in the second stage the fibre 3 is aligned with this axis of the polarizer. The said two stages are repeated until no further improvement is obtained over the position found in the preceding step.

Figure 9B:
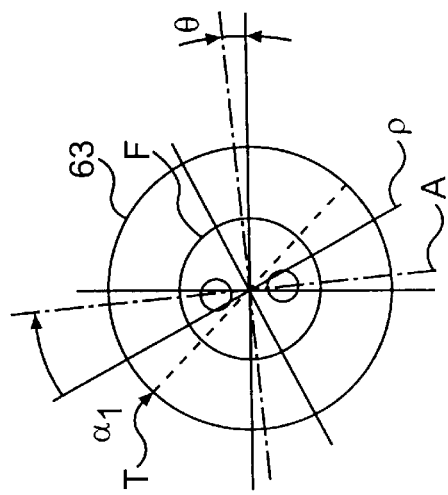

In particular, the method provides for the execution of the following steps, numbered progressively.

a) Sending, by means of the light source 68 and the polarizer 69, a polarized optical signal with a high extinction ratio (ER), orientated along one of the two axes of polarization of the fibre.

b) Emitting a light beam directed along the optical axis 67 from the end of the said fibre inserted in the connector.

c) Visually pre-aligning one of the two axes of polarization of the fibre, for example the slow axis, with the key of the connector, by observation under a microscope of the termination of the polarization-maintaining fibre, finding a position of this axis A which is most nearly perpendicular to the flat working surface 6; in FIG. 9a, by way of example, it is assumed that an error of visual alignment equal to the angle θ has been made.

d) Measuring and recording the active power and the extinction ratio (ER) at the output of the fibre by means of the meter 66.

e) Inserting the polarizer 63 in the aforesaid guide 64 between the fibre F and the meter 66 aligned with the optical axis 67 of propagation of the beam.

f) Rotating the polarizer 63 from its random initial position P about the optical axis 67 until the minimum power is measured by the detector 66.

g) Recording this angular position following the preceding rotation as $\alpha_1$, as shown in FIG. 9b.

h) Rotating the polarizer mounted on its base through 180° about its vertical axis γ1, bringing its rear face in front of the connector.

i) Rotating the polarizer about the optical axis 67 from the new initial position P' until the minimum power is again reached.

l) Recording this angular position as $\alpha_2$, as shown in FIG. 9c.

m) Rotating the polarizer about the axis 67 from the position $\alpha_2$ towards $\alpha_1$ by the angular quantity $(\alpha_2-\alpha_1)/2=\theta$ which is the angle between the axis of the polarizer and the vertical axis.

n) Aligning the fibre F with the determined axis of the polarizer by rotating the ferrule of the connector about the axis 67 until the power value recorded in stage d) is substantially obtained, less a predetermined value due to the losses caused by the polarizer which are, however, small (approximately 0.1 dB) with respect to the measured values; this operation is permitted by the structure of the connector which permits the rotation of the lock ring 3 and ferrule 2 assembly inside the casing 4.

o) Repeating operations d) to n) until the value $\theta=(\alpha_2-\alpha_1)/2$ is substantially constant and minimized, or, in general, for a predetermined number of times correlated with the desired degree of precision required. The minimum value θ found in the described experiment is 1/50 of a degree.

As regards the operation executed in stage c), FIGS. 7a, 7b and 7c show polarization-maintaining optical fibres in which the position of the principal axes of polarization can be recognized visually. FIG. 7a shows a polarization-maintaining optical fibre F in which two tensioning elements 72 of substantially circular shape are disposed symmetrically with respect to the central core 71 of the fibre. The principal fast axis of polarization in this type of fibre is orthogonal to the axis which passes through the centre of the said two stress zones, and the said fibre is referred to as the PANDA type. The axis previously defined as slow is orthogonal to the fast axis and is therefore vertical in FIG. 7a.

FIG. 7b represents a fibre F' in which a circular core 71' is present, surrounded by a stress element 72' of elliptical shape. The slow axis of polarization of the fibre coincides with the major axis of the said elliptical shape.

Finally, in the example shown in FIG. 7c, the fibre F" comprises a circular central core 71" and two stress zones 72" of substantially trapezoidal shape, disposed symmetrically with respect to the central core. In this fibre, the slow axis of polarization passes through the central axis which passes through the two trapeziums.

In all the cited examples, it is possible, by using a microscope, to determine, although only with approximate accuracy, the fast axis of polarization and consequently the slow axis of the fibre.

It should be noted that in the described method the alignment is advantageously carried out with respect to the axis perpendicular to the axis of polarization of the light beam, defined previously as the slow axis; this method provides an angular sensitivity much higher than in the opposite case, in other words the case in which alignment is to be carried out with respect to the fast axis. In particular, polarization is determined by measuring the minimum power at the power meter input. Consequently, when the axis with the minimum optical power has been found, the maximum is also determined, which in these fibres is always orthogonal to the minimum. The method also effectively provides an alignment between the fibre and the connector even in cases in which alignment is carried out with respect to the fast axis of the fibre.

This method is applicable wherever it is possible to rotate the direction of polarization of the light beam by rotation of the fibre. For example, an optical fibre, not necessarily inserted in a connector of the type described but fixed to a mechanism which allows it to rotate about its optical axis, may be aligned with a fixed reference, in our case the flat work surface, with which a further optical or opto-electrical device, such as an optical modulator, may be aligned, in such a way that the signal issuing from the fibre is connected to this unit with maintenance of the polarization.

A further characteristic of the present invention is the separate formation of a reliable reference, consisting of the polarizer aligned with the flat work surface, which may be used subsequently to align a fibre to a connector by using the said aligned polarizer.

Figure 10:
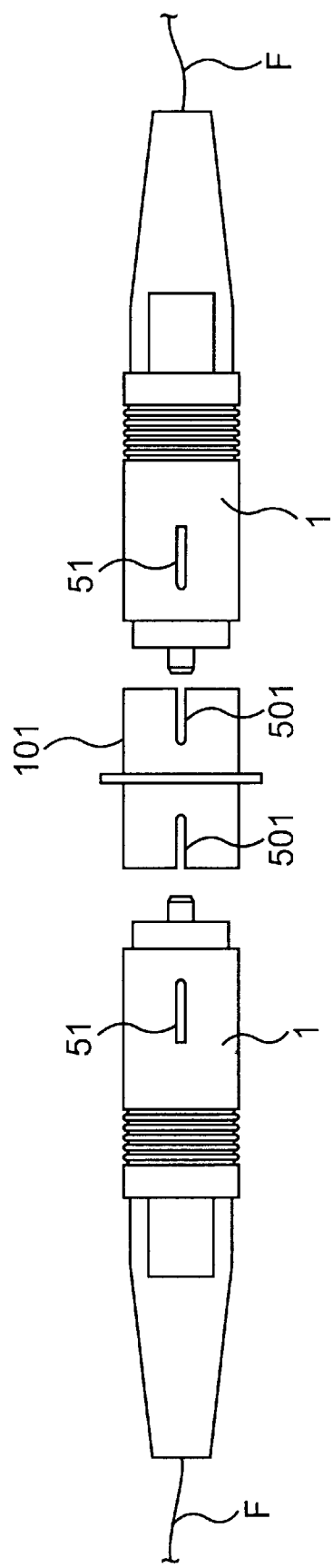
FIG. 10 shows a connection between two polarization-maintaining optical fibres, made by using the polarization-maintaining connector according to the present invention.

Finally, FIG. 10 shows a connection between two fibres F, inserted in two connectors 1 of the type described above, made by means of a bush 101 provided with two identical keys 501 corresponding to the keys 51 present on the connectors 1.

This connection is an example of the use of the connector according to the present invention; similarly, it is possible to connect a fibre to an optical unit provided with an insertion bush provided with a similar key to that of the bush 101.

What is claimed is:

1. Method of determining the axis of polarization of polarization-maintaining fibres, comprising:
    a) sending a polarized optical signal along a polarization-maintaining fibre (F);
    b) emitting said polarized optical signal from one end of said fibre in the form of a light beam directed along an optical axis and oriented along one of the two axes of polarization of said fibre;

c) inserting a polarizer having at least one axis of maximum or minimum transmissivity between the fibre (F) and an optical power meter in such a way that the optical axis of propagation of the beam passes through the polarizer, and with one of said axes oriented in a predetermined position with respect to a reference plane;

characterised in that it further comprises:

d) rotating said polarizer about an axis parallel to said optical axis until a minimum output power is measured by means of the optical power meter;

e) recording this angular position reached by the polarizer in the preceding step;

f) rotating the polarizer about an axis so as to bring its rear face in front of the emitting end of the fibre;

g) rotating the polarizer about an axis parallel to said optical axis until said minimum output power is measured;

h) recording the angular position reached by the polarizer in the preceding step;

i) rotating the polarizer about an axis parallel to said optical axis through an angle corresponding to half the difference between the two angles measured in the two preceding rotations;

j) rotating the optical fibre about the optical axis in such a way as to orientate one of its axes of polarization until said minimum output power is substantially measured on the meter;

k) repeating steps d) to j) until the angle of the rotation carried out in step i) becomes within a required degree of precision;

l) identifying the axis of polarization of the fibre (F) with the orientated axis of the polarizer.

2. Method according to claim 1, further comprising, between steps b) and c):

observing the end of the polarization-maintaining fibre under a microscope; and rotating the fibre about the optical axis into a position with one of the two axes of polarization substantially orthogonal to the reference plane.

3. Method according to claim 1, wherein said polarized optical signal is oriented along the slow axis of polarization of the fibre.

4. Method according to claim 1, wherein the axis of polarization of the fibre is oriented orthogonally to the reference plane and the axis of maximum transmissivity of the polarizer is aligned parallel to the reference plane.

5. Method according to claim 1, wherein said step of sending a polarized optical beam along a polarization-maintaining fibre (F) comprises connecting a light source and a polarizer to said fibre (F).

* * * * *